(12) United States Patent
Pagovich et al.

(10) Patent No.: US 7,111,760 B2
(45) Date of Patent: Sep. 26, 2006

(54) BABY BOTTLE REGULATION AND DISPENSING SYSTEM

(76) Inventors: Talia Pagovich, 55 East End Ave., New York, NY (US) 10028; Gil Pagovich, 55 East End Ave., New York, NY (US) 10028; Odelya Pagovich, 55 East End Ave., New York, NY (US) 10028; Shimon Pagovich, 55 East End Ave., New York, NY (US) 10028; Thomas J. Kiel, 63 Mine Mount Rd., Bernardsville, NJ (US) 07924

( * ) Notice: Subject to any disclaimer, the term of this patent is extended or adjusted under 35 U.S.C. 154(b) by 0 days.

(21) Appl. No.: 11/350,587

(22) Filed: Feb. 8, 2006

(65) Prior Publication Data

US 2006/0124668 A1    Jun. 15, 2006

(51) Int. Cl.
*B67D 5/38*   (2006.01)
*G01F 11/26*   (2006.01)

(52) U.S. Cl. .................... 222/158; 222/455; 222/457
(58) Field of Classification Search ............ 222/157, 222/158, 454, 455, 457, 482; 215/6, 11.1–11.6, 215/365, 366
See application file for complete search history.

(56) References Cited

U.S. PATENT DOCUMENTS

| | | | | |
|---|---|---|---|---|
| 2,208,862 A | * | 7/1940 | Stringfellow | 222/188 |
| 3,064,113 A | * | 11/1962 | Pitrone | 219/437 |
| 3,235,143 A | * | 2/1966 | Goodrich | 222/454 |
| 5,269,425 A | * | 12/1993 | Gomez-Acevedo | 215/11.1 |
| 5,489,049 A | * | 2/1996 | Robbins, III | 222/448 |
| 5,540,341 A | * | 7/1996 | Holley et al. | 215/11.4 |
| 5,638,968 A | * | 6/1997 | Baron et al. | 215/11.4 |

* cited by examiner

*Primary Examiner*—Joseph A. Kaufman
(74) *Attorney, Agent, or Firm*—Kenyon & Kenyon LLP (57) ABSTRACT

The invention relates to a formula regulation and dispensing system for baby bottles, which allows a controlled volume of formula to be administered through a baby bottle for feeding. This controlled amount of formula allows the user to monitor and regulate the consumption of liquid by an infant between required burpings. Using the invention, the user will know the proper time to burp the baby, thus reducing the occurrence of reflux and other conditions resulting from excess stomach gases.

5 Claims, 11 Drawing Sheets

BABY BOTTLE REGULATION AND DISPENSING SYSTEM

FIELD OF INVENTION

The present invention relates generally to a regulation and dispensing system for use in connection with baby feeding bottles, as well as methods of using that system to feed a baby more efficiently. More specifically, the present invention is directed to a device that allows the measuring and feeding of a controlled volume of formula to a baby through a baby bottle.

BACKGROUND OF THE INVENTION

New parents often are initially overwhelmed with both the joy and responsibility brought into their lives through the birth of a newborn baby. A primary concern for parents and caretakers is proper nourishment for their infant, since a majority of the baby's waking moments are devoted to feeding. Feedings can be exhausting when trying to effectively balance the variables that contribute to this process. Knowing how to hold the baby correctly and the proper time to burp the baby are critical factors that can reduce the occurrence of reflux, while minimizing spitting up. For example, often times it is recommended with newborn babies that they be burped each time they consume two ounces of formula. Precisely determining when that desired amount of formula has been consumed by a baby can be difficult, however, particularly while holding the baby in feeding position. Thus, babies often times are burped either too often or too little, neither of which is good for a baby. Alternatively, the feeding process must be frequently broken up to try to gauge how much of the formula has been taken from the bottle.

Use of the present invention to measure and regulate the amount of formula fed to the baby advantageously ensures correct feeding methods, resulting in proper nourishment and minimizing related complications for the baby. The present invention was designed for parents and caretakers who bottle feed or supplement with formula using a baby bottle. Of course, the device of the present invention also could be used by a caretaker to feed previously obtained breast milk to a baby, when the mother is away.

In the past, others have created devices and systems for regulating the feeding of formula to a baby, but none of these devices or systems comprises the unique combination of structural features of the present invention, which result in its advantages over those prior art devices and systems when used to feed a baby.

For example, U.S. Pat. No. 5,791,501 to Lyons describes a bottle assembly having a check valve arrangement, which allows equalizing air to enter the bottle during the pauses in the baby's sucking on the nipple. This reference does not disclose a metered dispensing device, however, instead focusing on the use of disc valves that control flow from the bottle to the nipple. Thus, Lyons's device could not be used in the manner of the present invention to administer a specific amount to formula to a baby.

U.S. Pat. No. 2,208,862 to Stringfellow describes a liquid measuring and dispensing device of the type often used in connection with dispensing alcoholic beverages, which would not be useful for the purpose of regulating the feeding a baby in the manner of the present invention. The device of Stringfellow comprises a measuring dispensing container which includes a trapped portion 12 with a vent tube 11 flowing from the trap into the bottle. Liquid pours from the bottle through the opening 3 into the measuring dispensing chamber and fills until the liquid reaches a height to fill the trap and thereby close the vent line. The difference in the size of the exit spout 6 and the entrance area 10 to the measuring chamber provides for the buildup of the liquid in the container to fill the trap 12.

Each of U.S. Pat. Nos. 6,054,254, 6,113,257 and 6,089,389 to Inbar and Sharon describe bottles having two or more compartments that are separate, for example, by means of a floating valve arrangement that is in contact with the neck of the bottle. These patents teach that a purpose of that compartmentalizing using such valve means is to permit mixing of the contents of the two containers at an appropriate time to prepare the formula for administration to a baby. There is no teaching or suggestion in these patents, however, of the dispensing and regulation device of the instant invention, having the advantages inherent therein.

U.S. Pat. No. 5,129,561 to Drobish describes a metering device for dispensing uniform volumes of liquid from a container, which metering device works by employing a series of concentric tubes and an air vent to limit the flow of liquid into a collecting chamber within the container. More specifically, liquid enters an accumulating chamber 20 through an inlet opening 27 and rises in the chamber until it covers vent hold 28. Once vent hold 28 is covered, liquid will stop flowing because of the vacuum created in the bottle due to lack of air. The bottle is then turned upright, allowing the liquid to enter into communication with the outlet 17 and further allowing air to go back into the bottle through the small air tube 23. The metering chamber 20 is partially segregated from the collecting chamber 21 by a transverse baffle 25, which projects horizontally from the lower end of the vertical wall 18 intermediate the metering chamber 20 and collecting chamber 21. Again, the device of Drobish is not suitable for use in dispensing formula to a baby in the manner accomplished through the instant invention.

None of the foregoing references, taken either singularly or in combination, describes or suggests the present invention comprising a container having an angled baffle that defines a measuring chamber and a consumption chamber, which together enable the user to determine the amount of liquid placed each time in the measuring chamber and transfer that measured liquid from the measuring chamber to the consumption chamber (for feeding to the baby).

Moreover, in light of the limitations of the devices and systems described in the above patents and the overall state of the prior art in this field, a need exists for a formula dispensing and regulation system that permits a parent or caretaker to consistently measure and feed a specific volume of formula to a baby, thereby ensuring that the parent or caretaker can effectively regulate the consumption of formula (or other liquid) by the baby (or infant) between, e.g., required burpings, thereby properly nourishing the baby and minimizing any complications it might experience. That need and other objects are fully met by the present invention and its methods of use described herein.

SUMMARY OF THE INVENTION

In one embodiment of the present invention, the regulation and dispensing device comprises a container (also referred to as a measuring unit) having two chambers, a first accumulation (or measuring) chamber that is translucent and calibrated and a second consumption chamber, which chambers are at least partially defined by an angled baffle extending part of the way across the container. The angled baffle within the container of the invention allows the user to place a precise, calibrated amount of liquid in the container when the bottle and connected device are inverted, for subsequent feeding to the baby. Also unique to the device of the instant invention is the regulator seal, which is configured and positioned relative to (or within) the container such that it enables one (through, e.g., proper positioning of the baby bottle and device by the user) to simultaneously stop the flow of liquid to the measuring chamber and transfer the previously measured liquid from the measuring chamber to the consumption chamber (for feeding to the baby).

The device of this embodiment of the invention may be configured and assembled in conjunction with a standard baby bottle and nipple as follows. The bottom of the measuring unit is attached to the top of the baby bottle (having its nipple first removed), such that the regulator seal (or seal) of the device is positioned between the baby bottle and the measuring chamber of the measuring unit. Such attachment may be accomplished by providing the measuring unit with threads that comport with those of the tops of standard baby bottles, such that the measuring unit can be twisted on to the baby bottle (in much the same manner as a nipple). The nipple is then attached to the top of the measuring unit, which again can be accomplished by providing the top of the measuring unit with threads to enable the nipple to be attached through a twist-on mechanism.

This embodiment of the invention can be used to feed a baby a precise amount of liquid at specific times, as follows. Once attached to a baby bottle (containing, e.g., formula) as set forth in the above paragraph, the entire assembly (baby bottle and the attached device of the invention) are inverted (at, e.g., a full 90 degrees) to provide a gravity flow of formula through an opening in the regulator seal and into the calibrated measuring chamber of the measuring unit. During such inversion, the user watches the formula fill the measuring chamber until such time as the desired amount (e.g., 2 ounces) has been placed in the chamber (as determined, e.g., by comparing the liquid level to calibration marks placed on the outside of the translucent measuring chamber). At such time, the user alters the angle at which the assembly is titled to, e.g., forty-five degrees, which alteration both cuts off the flow of liquid from the baby bottle to the measuring chamber (by ending the contact between the regulator seal and the liquid in the bottle) and transfers the previously measured amount of liquid from the measuring chamber to the consumption chamber (by altering the angle of the angled baffle inside the measuring unit relative to the horizon). The measured liquid is then available in the consumption chamber for feeding to the baby.

BRIEF DESCRIPTION OF THE DRAWINGS

The invention is further defined by reference to the drawings that are part of this specification. These drawings relate to the preferred embodiment of the invention that is discussed further in the specification of this patent application and are not limiting in any respect with regard to the full scope of the invention.

FIG. 10 is an isometric view of a seal of one embodiment of the invention, showing vents on the seal for allowing liquid to pass through.

DETAILED DESCRIPTION

The present invention is a device that provides a measured amount of formula to the baby when it is needed. The device may be attached to a standard baby bottle by simply twisting the unit onto the bottle (between the bottle and the nipple), for quick and easy use. Once the baby has been fed a measured amount of formula using the device, the baby may be burped. The procedure then repeats itself, with another amount of formula measured by the device and fed to the baby. Thus, the present invention allows the accurate measurement of a desired volume of liquid in order to regulate the feeding process, thereby controlling the burping frequency and ensuring that the baby is burped following the consumption of a regulated amount of liquid.

Figure 1:
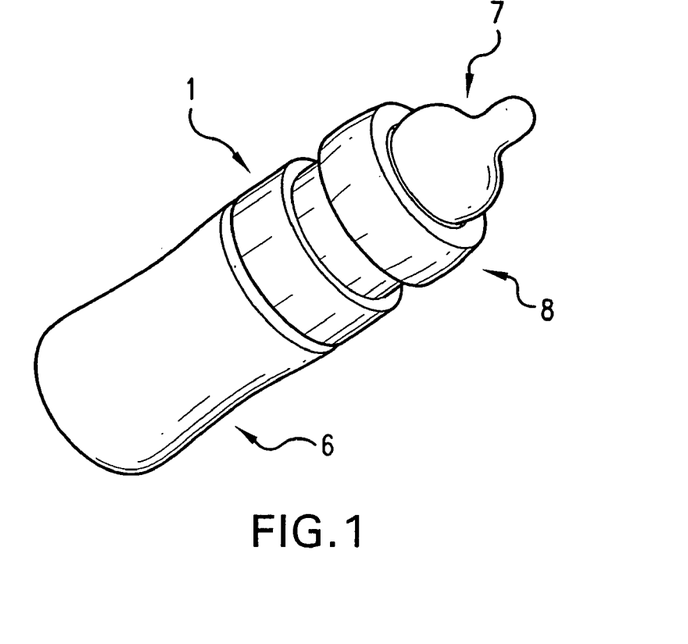
FIG. 1 is an isometric view of one embodiment of the invention attached to a standard baby bottle and nipple.
Figure 2:
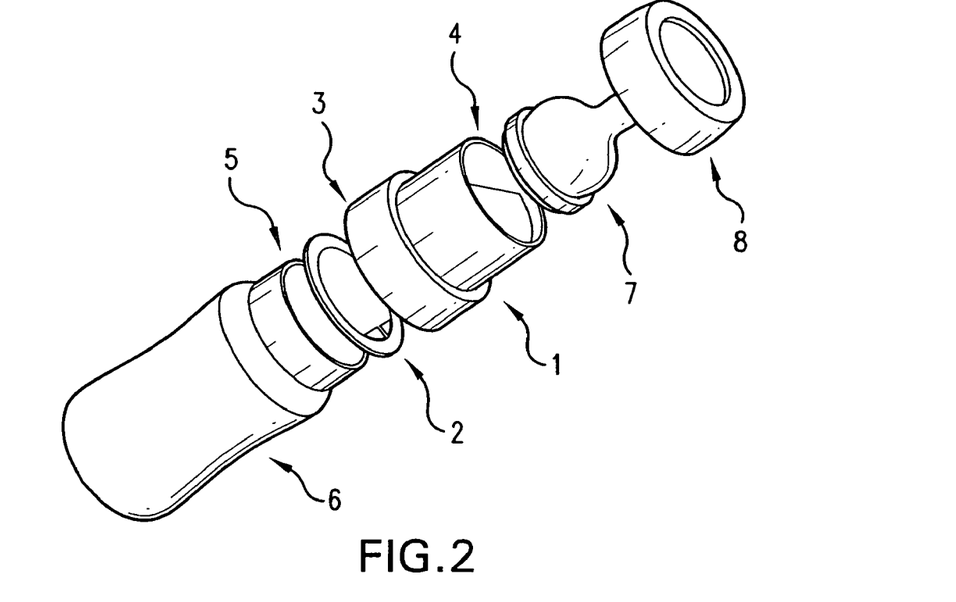
FIG. 2 is an isometric, exploded view of one embodiment of the invention attached to a standard baby bottle and nipple.
Figure 3:
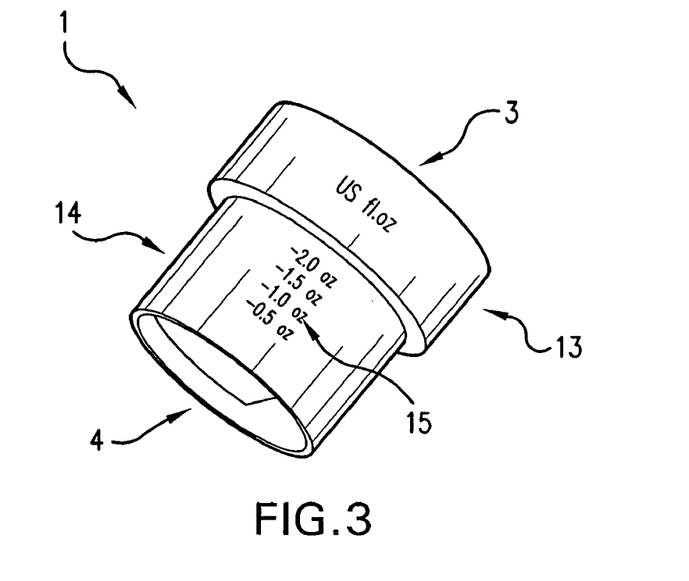
FIG. 3 is an isometric view of a measuring unit of one embodiment of the invention.
Figure 4:
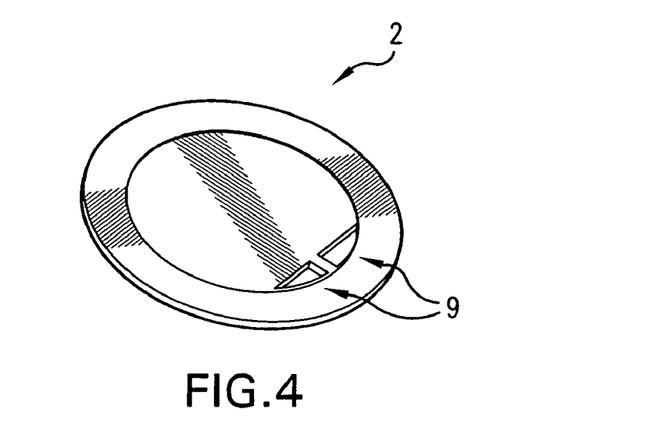
FIG. 4 is an isometric view of a regulator seal (or seal) of one embodiment of the invention.
Figure 5:
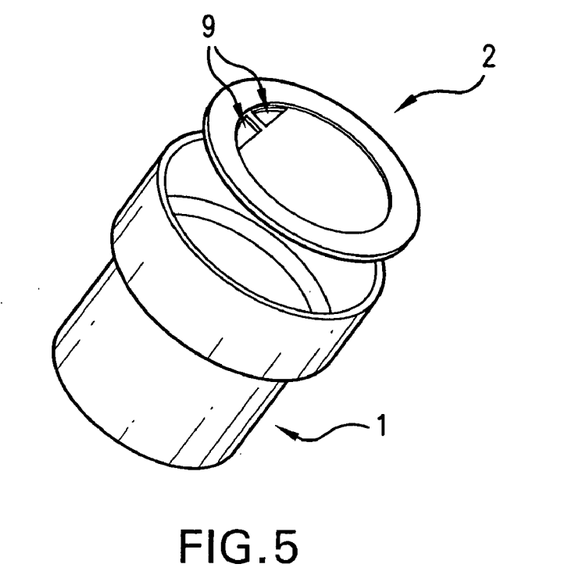
FIG. 5 is an isometric, exploded view of a measuring unit and regulator seal (or seal) of an embodiment of the invention.
Figure 6:
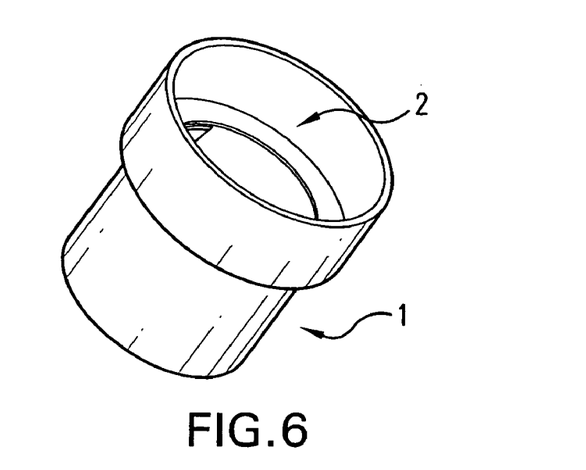
FIG. 6 is an isometric view of a measuring unit of one embodiment of the invention, showing the seal placed within the top part of the measuring unit.
Figure 7:
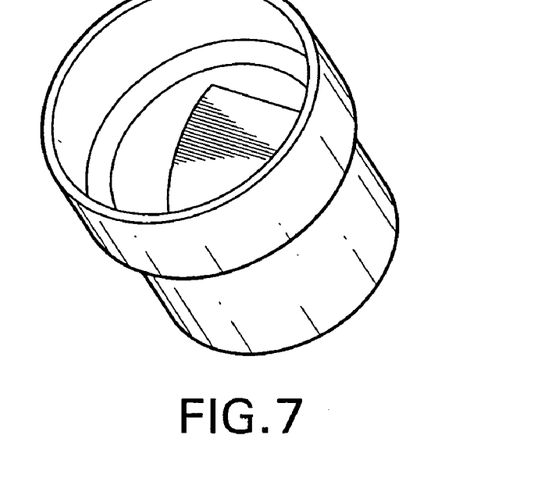
FIG. 7 is a top, isometric view of a measuring unit of one embodiment of the invention.
Figure 8:
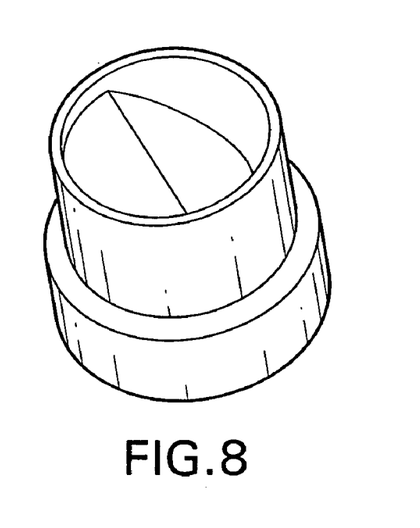
FIG. 8 is a bottom, isometric view of a measuring unit of one embodiment of the invention.
Figure 9:
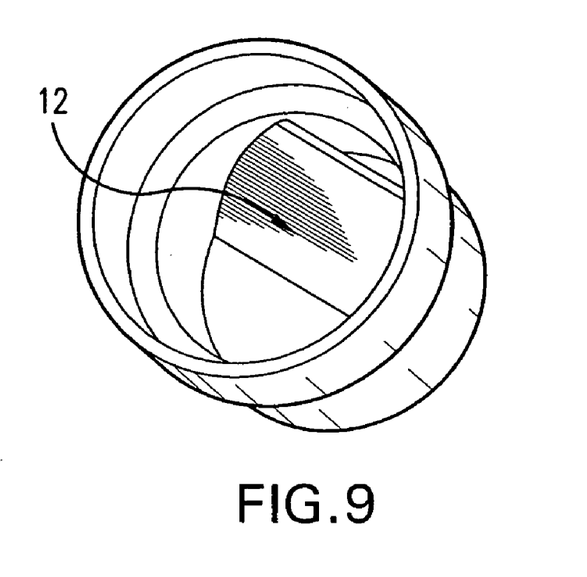
FIG. 9 is a bottom, isometric view of a measuring unit of one embodiment of the invention, showing an angled, internal baffle within the measuring unit.
Figure 10:
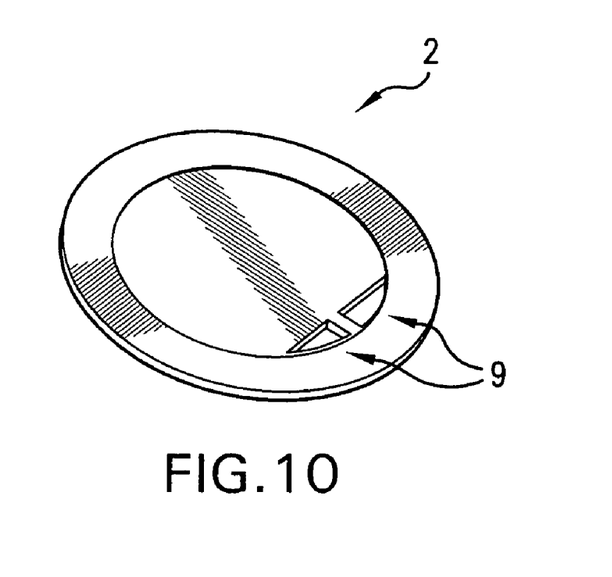

The regulation and dispensing system of the invention comprises a measuring unit and regulator seal, with the regulator seal positioned between the baby bottle and the measuring chamber of the measuring unit. The measuring unit of the invention comprises two chambers and is designed to be attached to a standard baby bottle from a specific manufacturer (e.g., Avent, Evenflo, Gerber, Playtex, Graco, Sassy, etc.). Each standard baby bottle configuration will typically have a corresponding unique measuring unit geometry that conforms to the diameter and thread size of the attachment face of the associated standard baby bottle. One of skill in the art, of course, would recognize that the measuring unit could be manufactured to fit any baby bottle, whether customized or mass produced. Following attachment to a baby bottle and nipple, the measuring unit of the invention functions to control the amount of formula that is available to the nipple of the bottle at any time. The regulation and dispensing system is depicted in FIG. 1, as assembled with a standard baby bottle and nipple assembly.

A. Structure of the Regulation and Dispensing System and Baby Bottle Assembly

Figure 12:
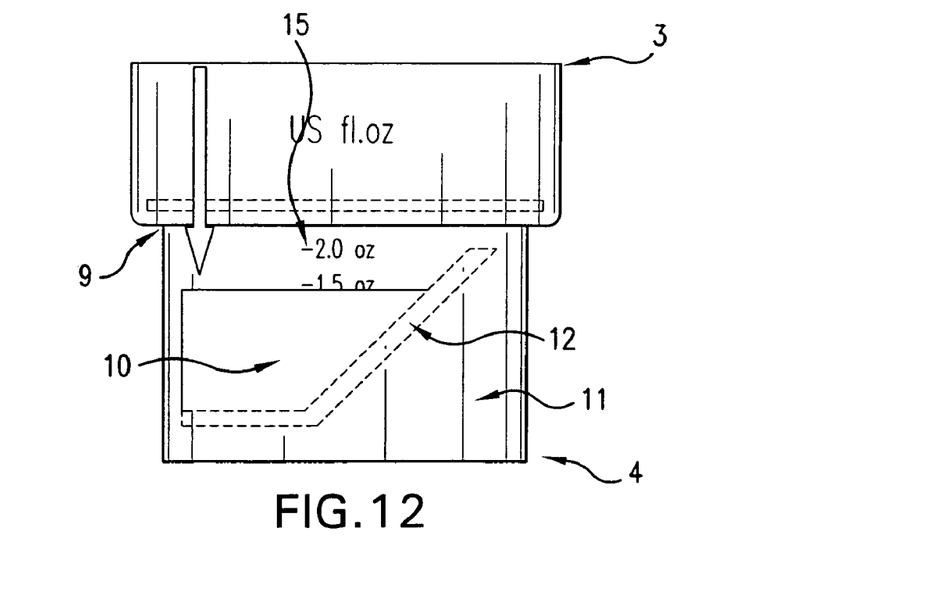
FIG. 12 is a side view of a measuring unit of one embodiment of the invention, showing the flow of liquid from the baby bottle into the measuring chamber through the vents in the seal, when the entire assembly is inverted as in FIG. 11.
Figure 13:
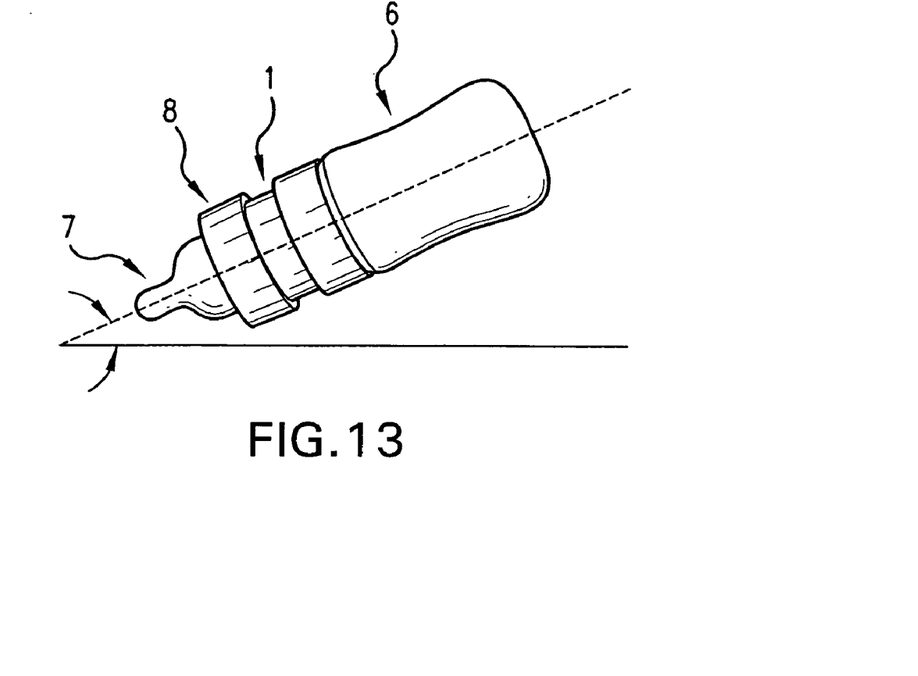
FIG. 13 is a side view of one embodiment of the invention as assembled with a standard baby bottle and nipple, with the entire assembly held at an angle of approximately 45 degrees or less.
Figure 14:
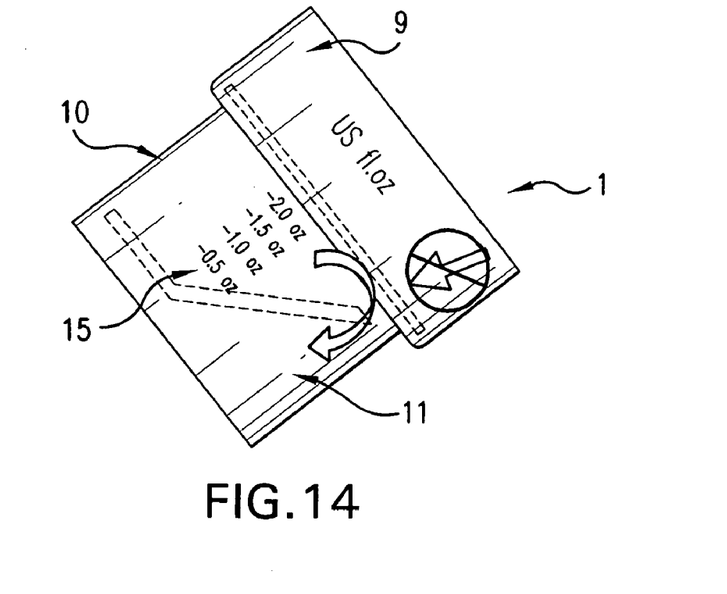
FIG. 14 is a side view of a measuring unit of one embodiment of the invention, showing the transfer of previously measured liquid from the measuring chamber to the consumption chamber, along with the prevention of further flow of liquid from the baby bottle to the measuring chamber because the liquid in the bottle is no longer in contact with the vents of the seal.

In the preferred embodiment of the regulation and dispensing system and process of the invention (which also is illustrated through FIGS. 1–22 hereof), and with particular reference to FIGS. 1 through 14, the device comprises a measuring unit (1) and a regulator seal (2) having two vents (9), with the measuring unit having a top (3) and a bottom (4). The top of the measuring unit is adapted to fasten over the top (5) of a standard baby bottle (6), and the bottom of the measuring unit is adapted to be connected to a standard nipple (7) on a baby bottle, using the standard clamping ring (8) accompanying the standard baby bottle. The measuring unit has two chambers, a measuring chamber (10) and a consumption chamber (11), which are separated from one another by an angled or inclined baffle (12) that extends internally at least part of the way across the width of the measuring unit. While separating the two chambers, the angled or inclined baffle also permits flow of liquid between those two chambers at appropriate times, when the measuring unit and baby bottle assembly are properly positioned (as shown in FIGS. 13 and 14). The measuring unit in the preferred embodiment is cylindrical in shape and has two diameters, a larger diameter (13) at the top and a smaller diameter (14) at the bottom. The top of the measuring unit connects it to the baby bottle and also holds the vented regulator seal, while the bottom of the measuring unit is adapted to fit into a standard nipple clamping ring assembly.

The measuring unit in the preferred embodiment is made of translucent material, to enable viewing of the liquid level in the measuring chamber (which is defined by a portion of the measuring unit located above the baffle, when the baby bottle is inverted with the top of the measuring unit attached to the top of the bottle). The accumulating (measuring) chamber formed by the angled baffle is calibrated (e.g., in half-ounce increments, from one-half ounce to two ounces, as shown in, e.g., FIG. 14), enabling the user to allow a precise amount of liquid to flow into the measuring chamber when the measuring unit is attached to a baby bottle. For example, this calibration can be accomplished by providing graduation lines (15) on the measuring chamber that show the volume of liquid that is being held therein.

Figure 11:
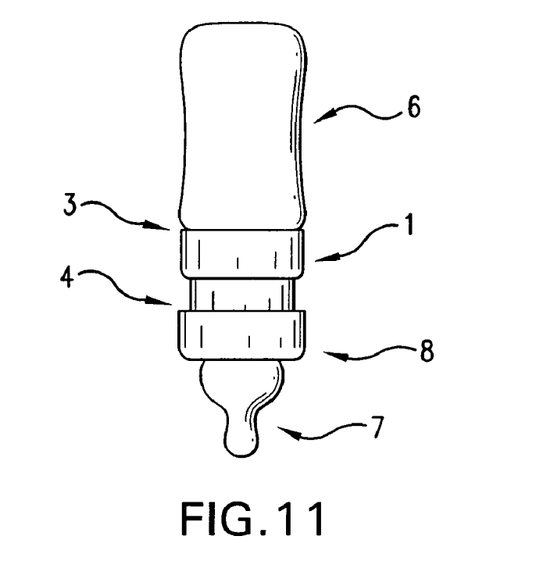
FIG. 11 is a side view of one embodiment of the invention as assembled with a standard baby bottle and nipple, with the entire assembly inverted at an approximately 90 degree angle.

The regulator seal in the preferred embodiment contains one or more vents (9), positioned to permit or prevent flow of liquid from the baby bottle to the measuring unit at the appropriate times. Specifically, the vents in the regulator seal permit flow of liquid from the bottle into the measuring unit when the bottle and measuring unit assembly is inverted (as depicted in FIGS. 11 and 12) and prevent such flow when that assembly is held at an angle (approximately 45 degrees or less) suitable for feeding a baby (as depicted in FIGS. 13 and 14). Moreover, preferably the regulator seal and the vents therein are oriented and positioned with respect to the baffle so that liquid pouring from the bottle into the measuring unit will be held within the measuring chamber by the baffle, thereby protecting against splashing of liquid over the baffle and into the consumption chamber (which action would reduce the precision with which the liquid is measured for feeding the baby). For example, the vents in the regulator seal can be positioned such that the liquid from the baby bottle flowing into the measuring unit is directed toward a wall of the measuring unit that is furthest away from the opening between the measuring chamber and the consumption chamber (defined by the distance between the baffle and another wall of the measuring unit).

Materials useful in making the invention include polypropylene, as well as any other plastic material suitable for holding liquids for infants. It is preferred that a flexible plastic be employed in making the parts of the invention. In addition, the invention could be made from glass or any other suitable material, provided that it is dishwasher safe, corrosion resistant and safe for the baby.

The foregoing description of the preferred embodiment of the invention is not intended to limit the scope of the invention in any respect. One of skill in the art would recognize, for example, that the measuring unit need not be cylindrical in shape or have two diameters, as those features are exemplary and relate to the preferred embodiment of the invention. Indeed, the measuring unit could take any geometrical shape of various diameters (or a single diameter), as long as it fulfilled its function of measuring and regulating the amount of liquid to be fed to a baby. Further, while the measuring unit of the preferred embodiment is entirely translucent, it also is possible to make it only partially translucent, so long as the user of the assembly can view the quantity of liquid being fed to the measuring chamber.

The Figures of the instant application depict the measuring chamber of the preferred embodiment as being capable of holding two ounces of fluid, with calibration lines appearing in one-half ounce increments (from 0.5 ounces through 2.0 ounces). As one of skill in the art would recognize, however, the measuring chamber could be made larger to enable it to hold greater quantities of liquid (e.g., 4 ounces) and have different calibration designations setting forth the greater quantity of liquid held.

Moreover, the foregoing description of the connection of the bottom of the measuring unit to the nipple through a clamping ring assembly is exemplary and relates to the preferred embodiment. The bottom of the measuring unit alternatively could be provided with any other suitable means of attachment to the nipple (such as matching threads to permit the nipple to be twisted on to the measuring unit, or a friction-based locking mechanism), so as to eliminate the need for a clamping ring. Likewise, the top of the measuring unit can be provided with the same or similar means for attachment to the top of the baby bottle.

In addition, one of skill in the art would recognize that the vented regulator seal need not be contained within the top of the measuring unit (as in the preferred embodiment), so long as it is positioned between the top of the baby bottle and the measuring chamber of the measuring unit to enable it to regulate the flow of liquid between the baby bottle and the measuring unit. For example, one skilled in the art would recognize that the baby bottle itself could be manufactured with a vented regulator seal removably attached at its top, which would consequently be appropriately positioned when the measuring unit was attached to the baby bottle. Also, one of skill in the art would recognize that the measuring unit could be combined with the bottle (or any one or more of the nipple, clamp or other assemblies associated with a baby bottle) to form a monolithic structure with or without a removable seal or baffle, in order to reduce the total number of components of the overall system.

B. A Method of Using the Measuring Unit and Baby Bottle Assembly

Using the device and method of the invention, a controlled volume of formula is made available at the feeding end of the bottle when desired. The volume of formula needed is pre-measured and may be varied as desired by the user. The volume of formula will also be easily accessible and available through the system within a matter of seconds.

The preferred embodiment of the invention can be used to feed a controlled volume of liquid to a baby as follows, with reference made to appropriate Figures. The use of the preferred embodiment of the invention also is illustrated and further explained in FIGS. 11 through 22 of the instant application. In particular, FIGS. 15 through 22 of the instant application recite five steps for carrying out the process of assembling the device of the invention, feeding a baby using it, and disassembling the device for cleaning purposes.

Figures 15, 16, 17:
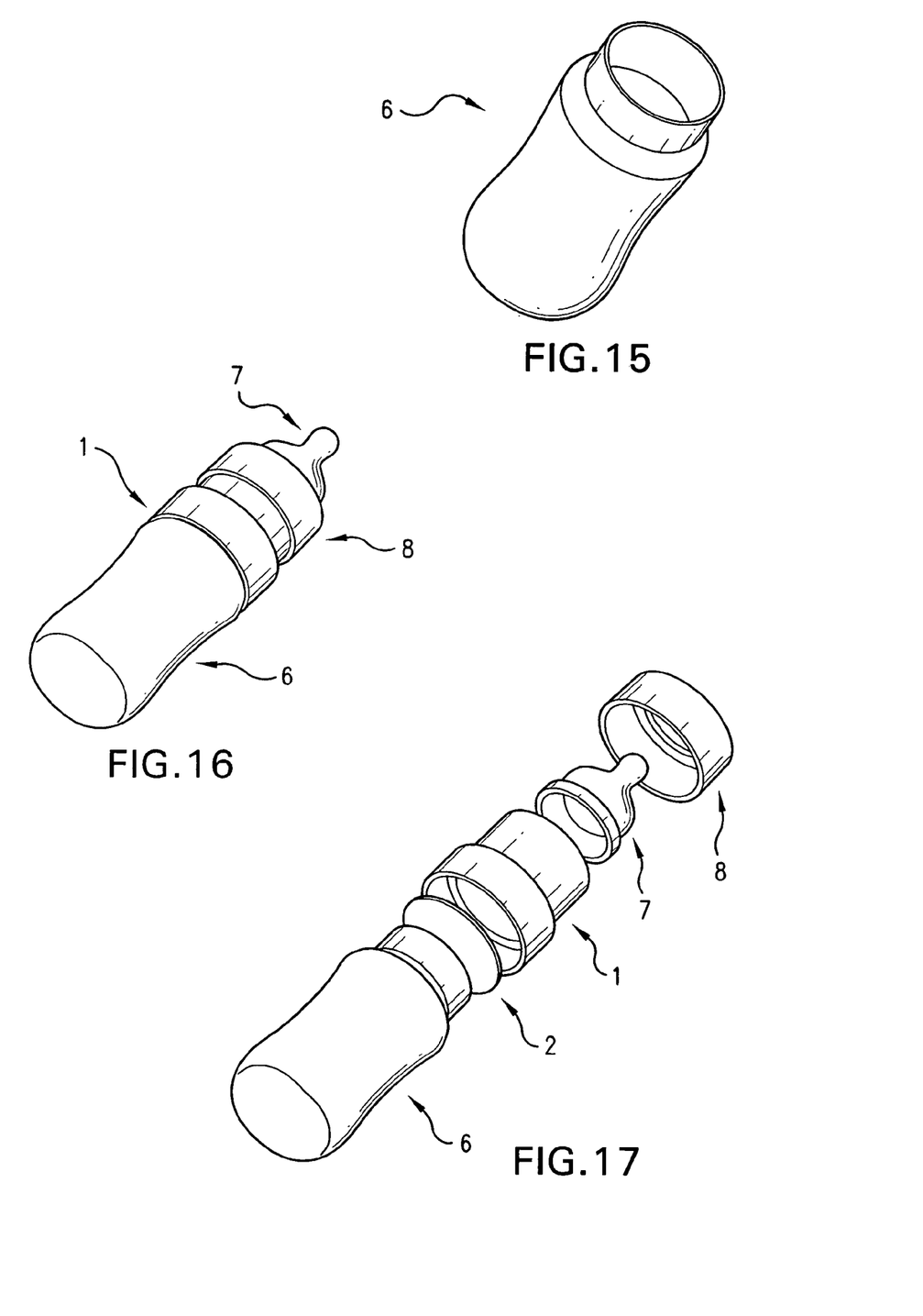
FIG. 15 is an isometric view of an empty baby bottle.
FIG. 16 is an isometric view of one embodiment of the invention as assembled with a standard baby bottle and nipple.
FIG. 17 is an isometric, exploded view of one embodiment of the invention as assembled with a standard baby bottle and nipple.
Figure 18:
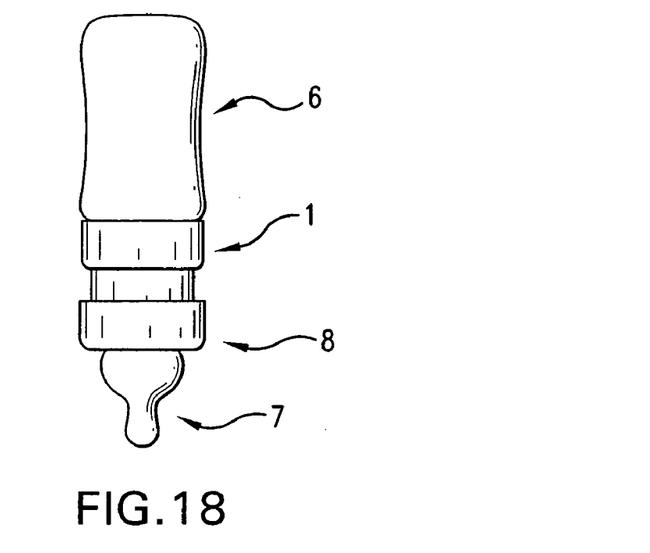
FIG. 18 is a side view of one embodiment of the invention as assembled with a standard baby bottle and nipple, with the entire assembly held in inverted position.
Figure 19:
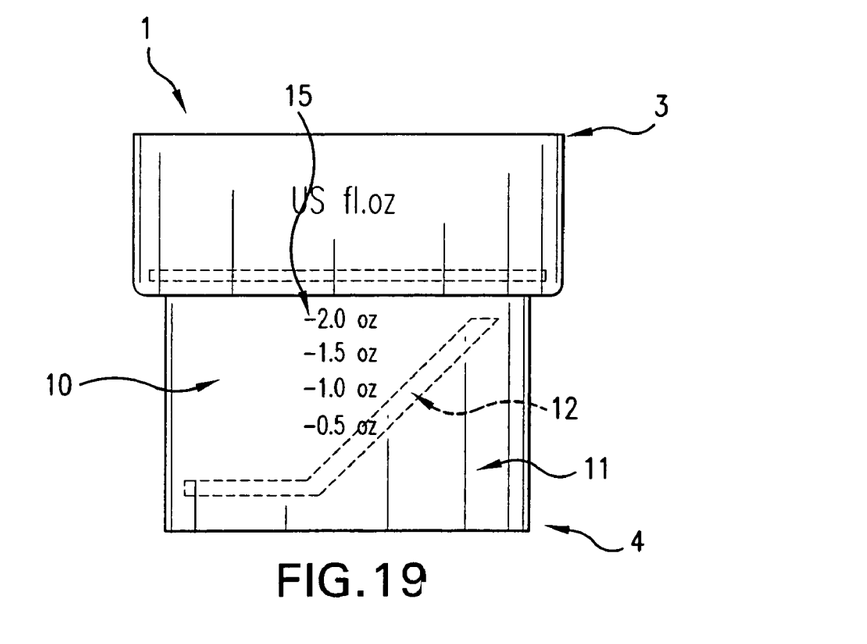
FIG. 19 is a side view of a measuring unit of one embodiment of the invention.
Figure 20:
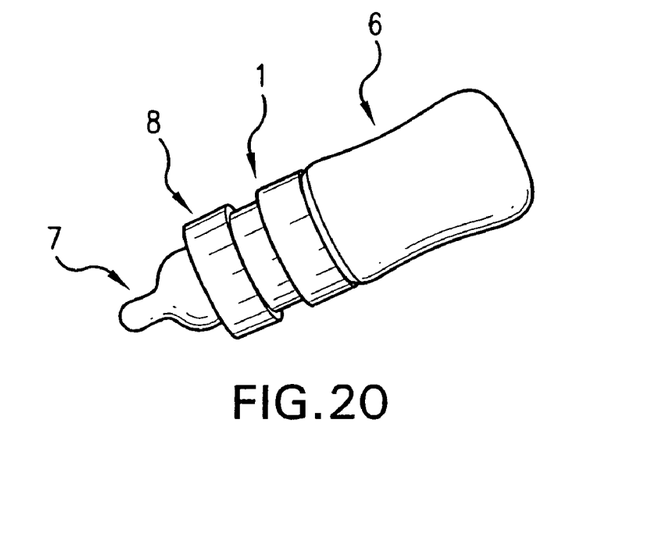
FIG. 20 is a side view of one embodiment of the invention as assembled with a standard baby bottle and nipple, with the entire assembly held at an angle of approximately 45 degrees or less (feeding position).
Figure 21:
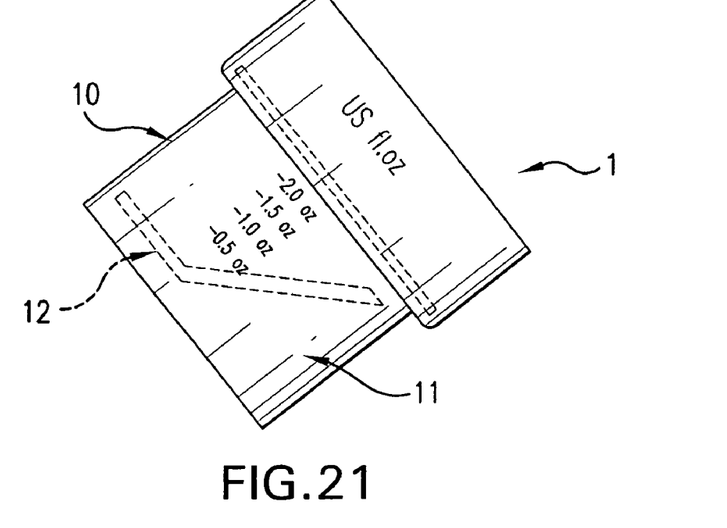
FIG. 21 is a side view of a measuring unit of one embodiment of the invention, illustrated in the feeding position.
Figure 22:
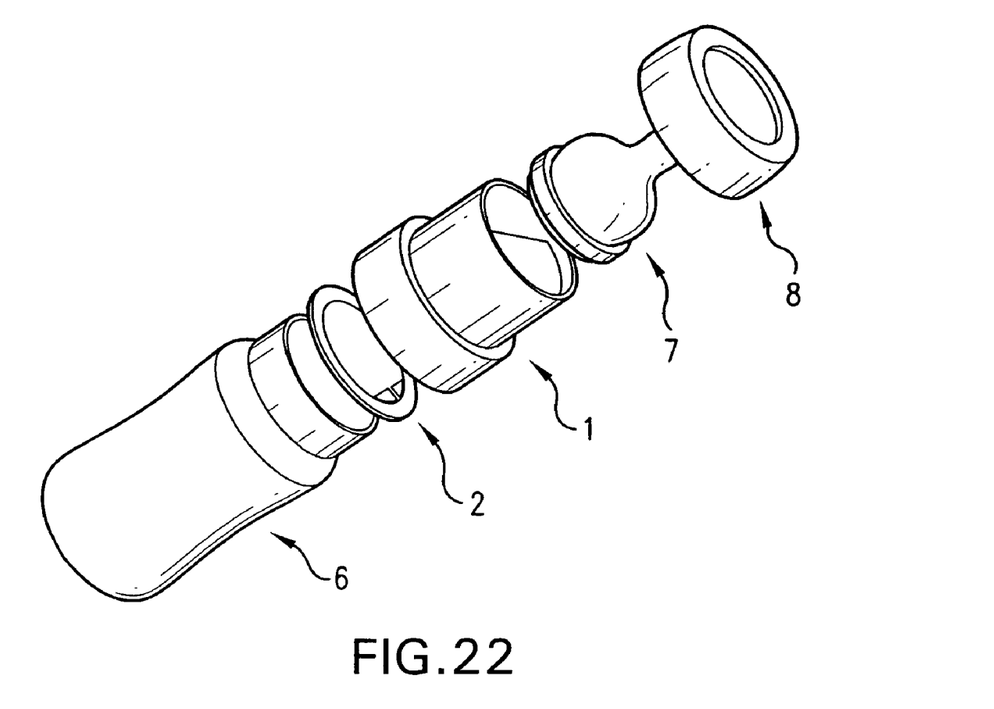
FIG. 22 is an isometric, exploded view of one embodiment of the invention as assembled with a standard baby bottle and nipple, showing its disassembly.

A standard baby bottle is filled with an appropriate liquid for consumption by a baby (as depicted in FIG. 15) and assembled with the preferred embodiment of the regulation and dispensing system and a standard nipple, in the manner described above (and depicted in FIGS. 1 and 2). The entire assembly is inverted as in FIG. 18, resulting in liquid from the baby bottle flowing through the vents (9) in the regulator seal (2) and into the calibrated measuring chamber (10) of the measuring unit (1), as depicted in FIG. 12. Once a desired level of liquid enters the measuring chamber (as determined by the user observing the level of liquid in the measuring chamber as compared to the calibration lines), the entire assembly is titled to an angle of approximately 45 degrees or less (referred to as the feeding position), as depicted in FIG. 20. The angle of the feeding position also helps ensure that the baby is propped correctly to be fed, again assuring proper nourishment of the baby.

As a result of tilting the assembly to the feeding position, the previously measured liquid in the measuring chamber is transferred from the measuring chamber to the consumption chamber (11) by traveling through a gap between the inclined (angled) baffle (12) and the wall of the measuring unit, as depicted in FIG. 14. At the same time, remaining liquid in the bottle no longer enters the measuring chamber because it is no longer in contact with the vents in the regulator seal, as shown by comparing the positions of those vents (9) in the inverted position (FIG. 12) with a feeding position (FIG. 14) of the assembly. Once the measured liquid has been transferred to the consumption chamber and into communication with the nipple (7) attached to the measuring unit, it can be fed to the baby. The baby can then be burped after consuming a known quantity of liquid (i.e., whatever amount was measured in the measuring chamber), thus providing better control over the baby's nourishment.

Of course, one skilled in the art would recognize the interrelationship between the angle of the baffle, the location of the vents on the regulator seal, and the appropriate angle for the feeding position, in terms of ensuring that tilting the assembly to the feeding position both transfers the measured liquid from the measuring chamber to the consumption chamber and prevents any further liquid from flowing through the vents and into the measuring chamber. For that reason, the definition of the feeding position has being at an angle of 45 degrees or less is merely exemplary and relates to the preferred embodiment of the invention, but is not intended to limit the scope of the invention. For example, as one of skill in the art would recognize, the invention could be constructed with the angle of the baffle decreased (relative to the latitudinal axis of the measuring unit) from that of the preferred embodiment, which would therefore increase the upper limit of the angle of the feeding position above 45 degrees (while still accomplishing all of the liquid transfer and stoppage functions of the invention).

Thus, use of the invention is simple and able to be performed by anyone capable of feeding with a standard bottle. The filling of liquid, mixing and shaking of formula will not be inhibited by the system. The system is capable of being disengaged instantly by someone not wishing to use it, since it is easy to assemble and disassemble. Likewise, the system and its components are easy to wash and are dishwasher safe, since there are no characteristics that may trap formula and powder or promote the buildup of mold or bacteria.

We claim:

1. A regulation and dispensing system for administering a controlled volume of liquid to a baby when attached to a baby bottle containing such liquid and a nipple, comprising:
    a measuring unit having a top, a bottom, a first wall, a second wall, an angled baffle attached to said first wall and extending part of the way toward said second wall, wherein said angled baffle is at an anile relative to the bottom of the measuring unit, a measuring chamber positioned between the top of the measuring unit and the angled baffle, and a consumption chamber positioned between the bottom of the measuring unit and the angled baffle, wherein said top of the measuring unit is releasably attachable to a baby bottle and said bottom of said measuring unit is releasably attachable to a nipple, and wherein said measuring chamber is calibrated for determining the amount of liquid held therein; and
    a regulator seal capable of being positioned between the top of the baby bottle and the measuring chamber, wherein said regulator seal has at least one vent positioned on the regulator seal to permit flow of liquid from the baby bottle into the measuring chamber when the measuring unit is attached to an inverted baby bottle and prevent flow of liquid from the baby bottle to the measuring chamber when the baby bottle and attached measuring unit are held at an angle for feeding the baby.

2. The system of claim 1, wherein said measuring unit is configured as a cylinder having two diameters, the top of said measuring unit having a greater diameter than the diameter of the bottom of said measuring unit.

3. The system of claim 2, further comprising a clamping ring, wherein said clamping ring is capable of releasably attaching the nipple to the bottom of said measuring unit.

4. The system of claim 3, wherein said baffle is angled at approximately 45 degrees relative to the bottom of the measuring unit.

5. The system of claim 4, wherein said measuring unit is manufactured from translucent material.

* * * * *